Feb. 4, 1958 C. F. PAYNE 2,822,073
TRANSPORTATION EQUIPMENT
Filed Sept. 29, 1954 2 Sheets-Sheet 1

Charles F. Payne
INVENTOR.

BY Charles E. Lightfoot
ATTORNEY

Feb. 4, 1958 C. F. PAYNE 2,822,073
TRANSPORTATION EQUIPMENT
Filed Sept. 29, 1954 2 Sheets-Sheet 2
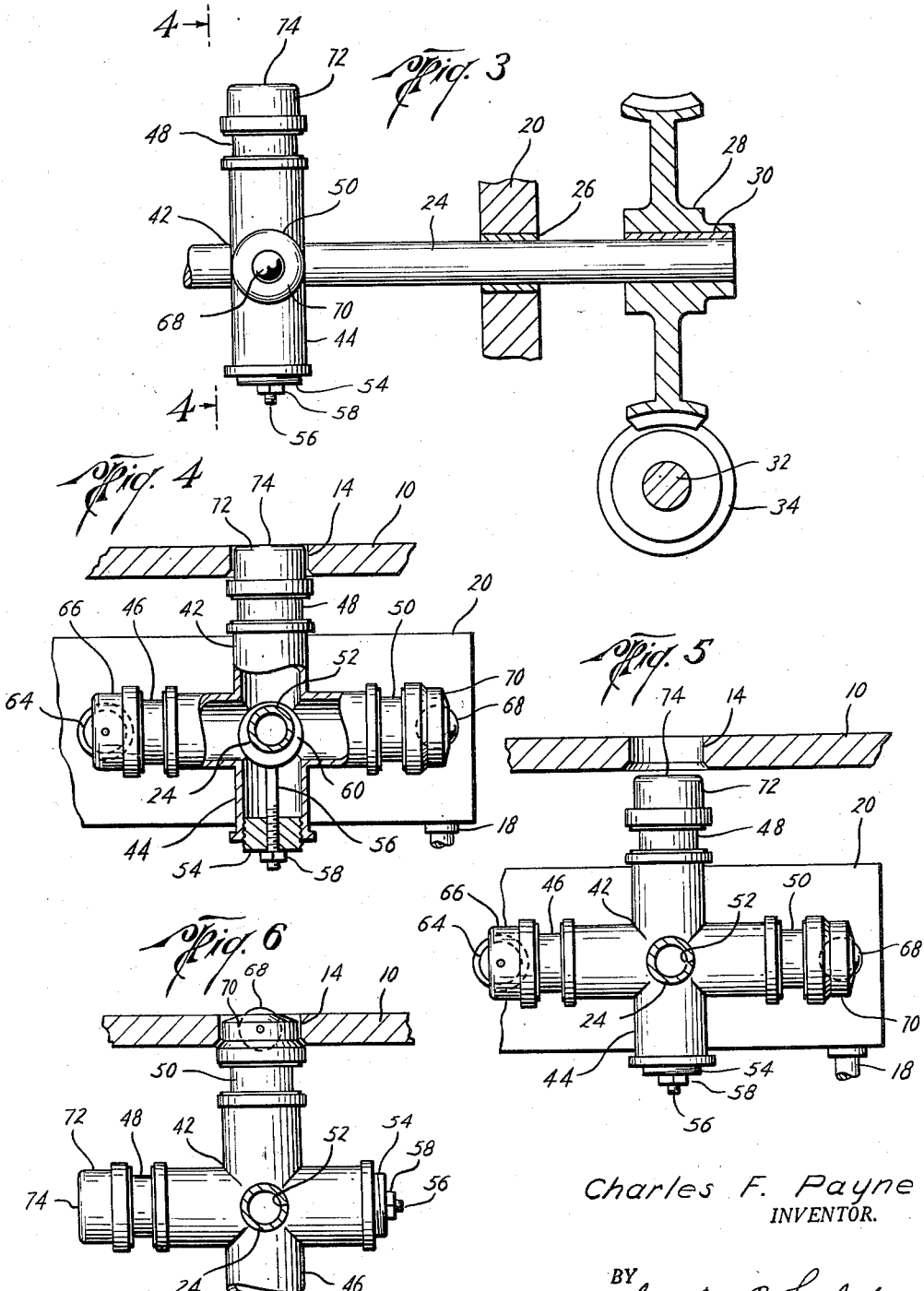
Charles F. Payne
INVENTOR.
BY Charles E. Lightfoot
ATTORNEY

United States Patent Office 2,822,073
Patented Feb. 4, 1958

2,822,073

TRANSPORTATION EQUIPMENT

Charles F. Payne, Katy, Tex.

Application September 29, 1954, Serial No. 459,113

1 Claim. (Cl. 193—35)

This invention relates to transportation equipment and more particularly to mechanism for use in connection with load supporting or carrying platforms to facilitate the handling and positioning of articles thereon.

While not limited to such use, the invention finds particular application in connection with vehicles employed in the transportation of various kinds of goods, and especially in the transportation of heavy or bulky articles which are difficult to handle and move about into the desired positions on such vehicles.

In the transportation of articles which are of heavy or bulky nature, the handling and moving about of such articles to position the same on the beds of vehicles, or on loading platforms, often requires the expenditure of much time and labor, due to the fact that such articles do not readily slide on load supporting surfaces and must be lifted for moving. For reasons of economy in the utilization of space and to accomplish the most efficient distribution of the load it is also often desirable to move the articles about in several different directions to locate them in the desired positions.

Heretofore, attempts have been made to facilitate the loading and unloading of vehicles, platforms, and the like, by the provision of various systems of conveyors, rollers, or similar means associated therewith, whereby heavy or bulky articles could be moved along the supporting surfaces without lifting. One difficulty encountered in the use of such devices, however, is that they are usually arranged to allow articles to be rolled over the supporting surface in one direction only, and in order to move the articles in some other direction it becomes necessary to slide the articles. Thus, in loading articles onto a truck whose bed is provided with rollers to facilitate moving the articles longitudinally of the bed, it may be necessary to slide the articles laterally of the bed in order to properly distribute the load and to obtain the maximum use of the available loading space.

Another disadvantage of load handling equipment of the usual type having roller means, or the like, for facilitating the movement of articles over a load supporting bed or platform, is that such means are usually located in fixed relation to the load supporting surface, and projecting above the same, so that there is likelihood of shifting of the lading in transit.

The present invention has for its chief object the provision of means for use with load supporting platforms or beds, whereby the above disadvantages may be overcome, and by which the movement of articles in any direction over the load supporting surfaces of such platforms or bed is greatly facilitated.

Another object of the invention is to provide load facilitating mechanism for use in connection with load supporting platforms, and including different types of rotatable load engaging elements and means for moving the same into and out of positions projecting above the load supporting surface for engagement with articles to be moved about on such surface.

A further object of the invention is the provision of load facilitating means for use with load carrying platforms and including rotatable load supporting elements which are adapted to be raised and lowered into and out of positions extending through openings in the platform to project above the platform for engagement with articles to be moved over the platform, and also including closure elements which may be moved into position to close the openings when said load supporting elements are not in use.

Another object of the invention is to provide load facilitating mechanism, embodying sets of rollers and balls, and means for supporting the same so that either the rollers or the balls may be moved through openings in a load supporting platform into and out of positions extending above the platform for engagement with articles to be moved about on the platform.

A further object of the invention is the provision of load facilitating mechanism of the kind referred to having pressure fluid means for elevating and lowering the different elements and supporting the same in any position of adjustment relative to the load supporting platform.

Another object of the invention is to provide load facilitating mechanism which is easily applied to load supporting platforms or beds of various types, and whose parts are readily assembled, disassembled and adjusted for purposes of repair or replacement.

A still further object of the invention is to provide load facilitating mechanism of the character described which is of simple design and rugged construction, capable of long withstanding the extreme conditions of hard usage and exposure to which equipment of this type is likely to be subjected.

The above and other important objects and advantages of the invention may best be understood from the following detailed description, constituting a specification of the same, when considered in conjunction with the annexed drawings, wherein—

Figure 3 is a fragmentary, detail view, partly in cross-section and on an enlarged scale, showing details of construction of a portion of the operating mechanism of the invention;

Figure 4 is an end elevational view, partly broken away, of the invention as illustrated in Figure 3, showing the closure element of the invention in closing position in an opening in a load supporting platform;

Figure 1:
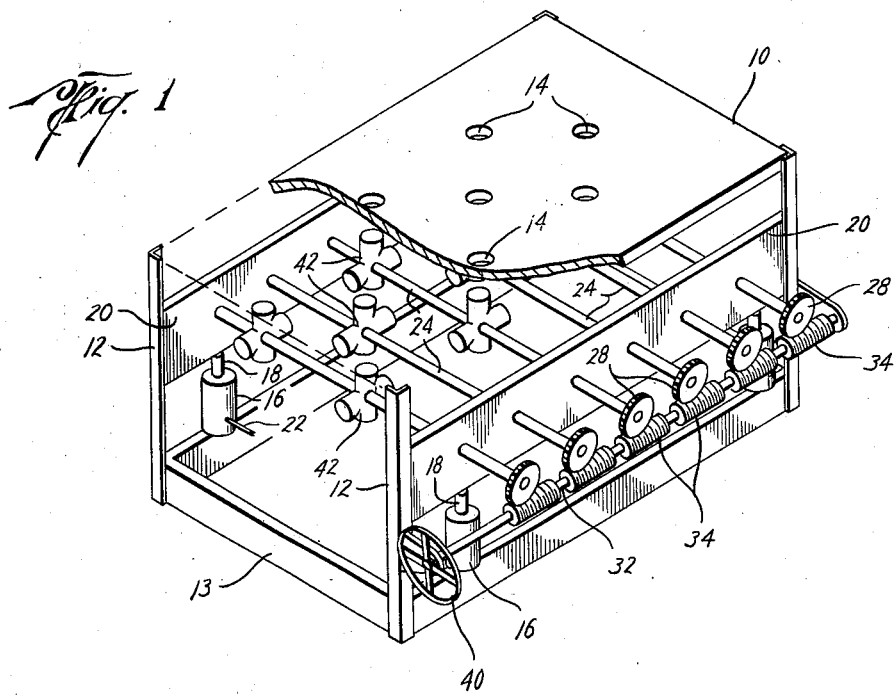
Figure 1 is a fragmentary, perspective view, illustrating somewhat diagrammatically a preferred embodiment of the invention and showing the same applied to a load supporting platform.
Figure 2:
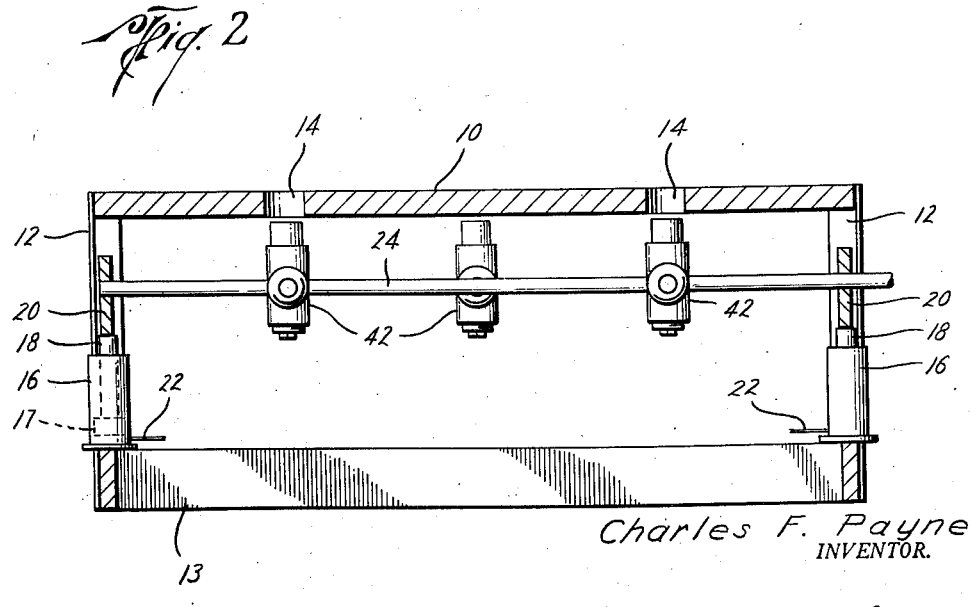
Figure 2 is a central, longitudinal, cross-sectional view, on a somewhat enlarged scale, of the invention as shown in Figure 1.

Figure 5 is a view similar to that of Figure 4, showing the mechanism of the invention with the closure element thereof in lowered position preparatory to the movement of a load engaging element into position for movement of the same to load engagement position; and Figure 6 is a view similar to that of Figure 4, showing the mechanism of the invention with one of the load-engaging elements extending through the opening in the platform in load-engaging position.

Referring now to the drawings in greater detail, the invention is illustrated by way of example in its application to a load carrying platform or bed 10, such as the body of a truck, which is supported by suitable means, such as a frame having upright frame elements 12, secured at their upper ends to the platform and whose lower ends are suitably connected to a base 13, such as may be provided by the frame of a truck. In the present illustration the uprights 12 take the form of angle members forming vertical guides for the mechanism by which the load engaging elements of the invention are supported.

The platform or bed 10 is provided with suitably spaced rows of openings 14, therethrough, through which the load engaging elements may be extended for engagement with articles which are to be moved about over the platform.

Beneath the platform 10 lifting means such as the pressure fluid cylinders 16 are suitably supported on the base 13 or frame of the vehicle, in which cylinder pistons 17 are disposed which carry piston rods 18 projecting upwardly into engagement at their upper ends with cross members 20 whose opposite end portions are in vertical sliding engagement with the uprights or guides 12. Each of the cylinders 16 may have an inlet pipe, such as that indicated at 22 near its lower end through which pressure fluid from a source of pressure, not shown, may be supplied to or exhausted from the cylinder to elevate or lower the piston therein.

A rod or tubular shaft 24 is supported for rotation beneath each row of the openings in suitable bearings, such as that shown at 26 in Figure 3, carried by the cross members 20. Each shaft 24 has an end portion extending beyond one of the cross members which is provided with a gear 28 which is suitably keyed thereon, as indicated at 30 in Figure 3.

An operating shaft 32, disposed parallel to the cross members 20 is supported for rotation in suitable bearings attached to the uprights 12, and on this shaft worms 34 are carried for rotation with the shaft in intermeshing engagement with the gears 28, whereby all of the gears will be rotated simultaneously upon rotation of the operating shaft. Suitable means, such as the hand wheel 40, on the shaft 32, is provided whereby the same may be readily rotated.

Each of the shafts 24 carries a number of cross heads 42, there being one such cross head beneath each of the openings 14. These cross heads may be of tubular formation having four arms 44, 46, 48 and 50, respectively, and an opening 52 extends centrally through each cross head through which the shaft 24 is slideably extended.

Within the arm 44 a plug 54 is threaded, which carries a bolt 56 extending inwardly therefrom and which is provided with a nut 58. At its inner end the bolt 56 has an enlargement 60 through which an eccentrically disposed opening is formed through which the shaft 24 is slideably fitted. By this arrangement the nut 58 may be loosened to permit the crosshead to be moved to any desired position of adjustment on the shaft and when the nut is again tightened the crosshead will be held against movement relative to the shaft. In this manner the crossheads may be adjusted on the shafts so that one of the arms 44, 46, 48 or 50 is accurately positioned in axial alignment with the corresponding opening 14 of the platform, and upon rotation of the shafts 24 90 degrees, another one of the arms of each crosshead will then be disposed in axial alignment with the corresponding opening.

One or more rollers 64 is rotatably carried by the arm 46 of each crosshead, at the outer end of the arm, in suitable bearing means, such as that indicated at 66, and a ball 68 is rotatably carried at the outer end of the arm 50 in suitable bearing means such as that shown at 70. The bearing means 66 and 70 may be removably attached to the respective arms to facilitate replacement when necessary.

The outer end of the arm 48 of each crosshead is provided with a closure cap 72, which is of a size to fit snugly in the opening 14 to close the same when moved into position therein.

In making use of the equipment, constructed as described above, the closure caps 72 may be positioned in the openings 14 of the platform so that their outer end faces 74 are substantially flush with the upper surface of the platform, thus closing the openings, whereby the platform is adapted for the carrying of such substances as sand or grain without danger of leakage of the same through the openings. Should it be desired to move relatively heavy objects over the surface of the platform the cross heads may be lowered by exhausting the pressure fluid from the cylinders 16, permitting the cross members 20 to move downwardly and withdrawing the closure caps 72 from the openings. The handwheel may then be rotated to cause the shafts 24 to turn 90 degrees to move the arms 46 into axial alignment with the openings. By introducing pressure fluid into the cylinders the cross members 20 may then be elevated to position the rollers 64 at any desired height above the upper surface of the platform. With the rollers thus located, objects may be rolled over the platform to the desired location. When the platform has been loaded in this manner, the crossheads may be lowered to withdraw the rollers, permitting the objects to rest directly on the platform.

Should it be desired to load objects on the platform and to uniformly distribute the load thereon, the crossheads may be lowered and rotated to position the arms 50 in alignment with the openings and then raised again to position the balls at a desired elevation above the upper surface of the platform, whereupon objects may be rolled in any direction over the platform to position them for best distribution of the load. The crossheads may then be lowered, if desired, to withdraw the balls and permit the objects to rest directly on the platform. In order to unload objects from the platform the rollers or balls may be positioned above the surface of the platform in the manner previously described to permit rolling of the object over the platform.

It will thus be seen that the invention provides load facilitating means which is easily operated and which occupies an out-of-the-way position when not in use.

While the invention has been disclosed herein in connection with a certain specific embodiment of the same, it will be understood that this is intended by way of illustration only, and that numerous changes can be made in the construction and arrangement of the various parts, without departing from the spirit of the invention or the scope of the appended claim.

Having thus clearly shown and described the invention, what is claimed as new and desired to secure by Letters Patent is—

In load handling equipment a platform having a load receiving surface and an opening therethrough substantially normal to the plane of said surface, a shaft positioned beneath said opening in substantially parallel relation to said surface, means supporting the shaft for axial rotation, a crosshead mounted on said shaft for longitudinal movement thereon, to a position located axially beneath the opening, means for releasably securing the crosshead to the shaft in said position for rotation with the shaft, radially extending arms on the crosshead positioned to be moved into and out of axial alignment with the opening upon rotation of the crosshead, means for rotating the shaft to position a selected one of said arms in such axial alignment, and means for moving the shaft toward and away from the platform to move said one of said arms into and out of a position extending through the opening.

References Cited in the file of this patent
UNITED STATES PATENTS

| | | |
|---|---|---|
| 559,552 | Turner | May 5, 1896 |
| 2,179,047 | McMurry | Nov. 7, 1939 |
| 2,360,133 | Houssiere | Oct. 10, 1944 |